(12) United States Patent
Darakananda

(10) Patent No.: US 7,954,290 B2
(45) Date of Patent: Jun. 7, 2011

(54) CONTINUOUS RESIN FABRIC

(75) Inventor: Nithiphan Darakananda, Bangkok (TH)

(73) Assignee: Sonite Innovative Surfaces Co., Ltd., Wangthonglang, Bangkok ( * ) Notice: Subject to any disclaimer, the term of this patent is extended or adjusted under 35 U.S.C. 154(b) by 395 days.

(21) Appl. No.: 12/108,645

(22) Filed: Apr. 24, 2008

(65) Prior Publication Data

US 2008/0268212 A1    Oct. 30, 2008

(30) Foreign Application Priority Data

Apr. 26, 2007 (TH) ................................. 0701002086

(51) Int. Cl.
*E04C 1/00* (2006.01)
(52) U.S. Cl. .......................................... 52/309.1; 442/2
(58) Field of Classification Search ................ 442/2, 15, 442/19, 43, 44, 45, 286; 52/306, 307, 308, 52/309.1; 428/103, 141, 142, 144, 147, 195.1, 428/202, 201, 297.1, 297.4, 297.7, 542.2, 542.6, 542.8, 543, 904.4, 913.3
See application file for complete search history.

(56) References Cited

U.S. PATENT DOCUMENTS

| | | | | |
|---|---|---|---|---|
| 2,951,001 A | * | 8/1960 | Rubenstein | 428/142 |
| 3,180,779 A | * | 4/1965 | Conger et al. | 428/162 |
| 3,194,856 A | * | 7/1965 | Palmer | 264/112 |
| 3,239,364 A | * | 3/1966 | Carlisle et al. | 427/197 |
| 3,343,975 A | * | 9/1967 | Daneski et al. | 427/195 |
| 3,519,527 A | * | 7/1970 | Crowley | 428/159 |
| 7,323,251 B2 | * | 1/2008 | Saitou | 428/480 |
| 2002/0168503 A1 | * | 11/2002 | Dong et al. | 428/195 |

* cited by examiner

*Primary Examiner* — Arti Singh-Pandey
(74) *Attorney, Agent, or Firm* — Steven L. Nicho's; Van Cott, Bagley, Cornwell & McCarthy P.C.

(57) ABSTRACT

A decorative surface covering includes a fabric; and a layer of molded resin disposed on said fabric, where the resin is molded into decorative features of the covering. A method of forming a decorative surface covering includes molding resin disposed on a fabric to produce decorative features, the resin adhering to the fabric.

19 Claims, 2 Drawing Sheets

CONTINUOUS RESIN FABRIC

RELATED APPLICATION

The present application corresponds to and claims the priority under 35 U.S.C. §119 of Thai Patent Application No. 0701002086 filed on Apr. 26, 2007.

BACKGROUND

When decorating the interior of various buildings, including homes and offices, the walls and floors are frequently covered, for example, with various types of tile, mosaic, glass, stone, or ceramic. However, the disadvantages of using such materials in building decoration are that these materials are heavy, easily breakable, and expensive. In addition, these materials may be limited in colors, sizes, thickness, shapes, and features with insufficient varieties.

Additionally, if the floor or wall covering is to be made of elements, like tiles, that are arranged into various patterns, e.g., floral patterns or ethnic patterns, highly precise arrangement of these materials may be required. To form such patterns, these materials must typically be arranged piece by piece in order to create the desired pattern. Consequently, a skilled artisan is required, adding to the time consumed and the installation costs.

Moreover, the application and arrangement of such conventional floor and wall covering materials is typically made with the use of adhesive that is applied to each piece of the tile, mosaic, glass, stone, or ceramic that is being used to cover the building surface, such as a floor or wall. The fact that these materials can be heavy and that the adhesive may weaken over time makes them prone to falling off and breaking and may cause some danger.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
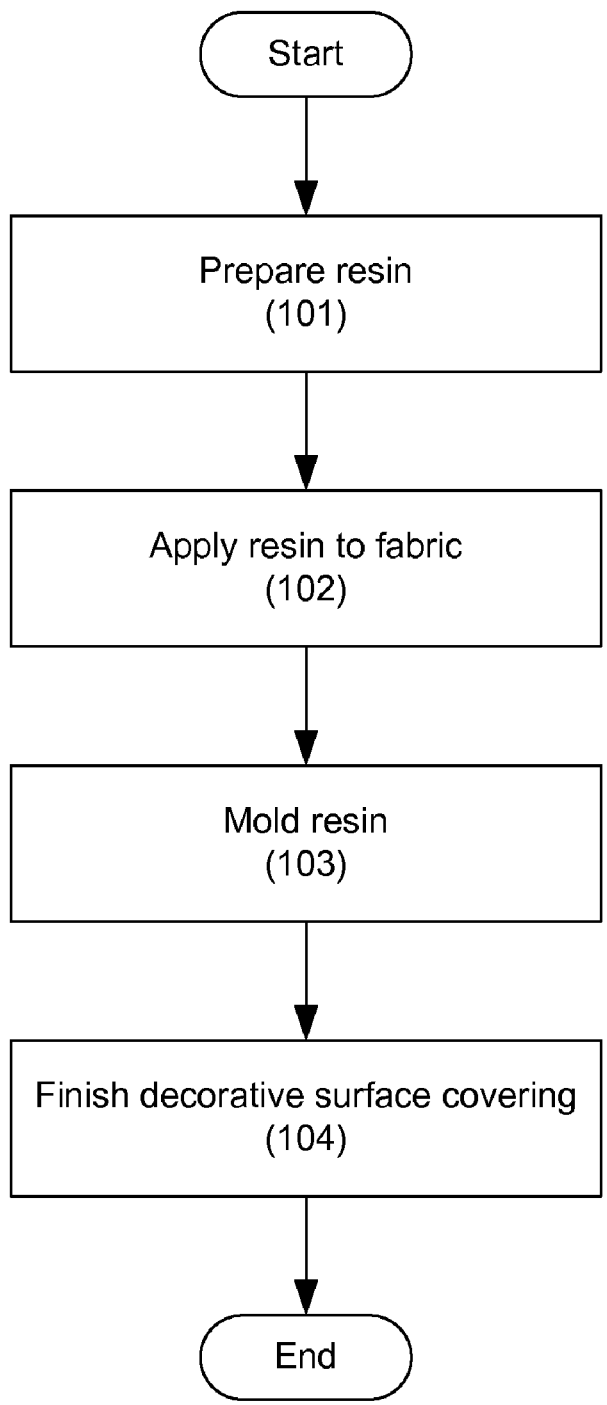
FIG. 1 is a flowchart showing an illustrative method of forming a decorative surface covering according to principles described herein.

Given the issues outlined above, efforts have been made to search for new materials to replace traditional wall, ceiling, and floor decorative materials. One example of such an alternative decorative material is molded resin.

Resins or polyester resins are a kind of plastics that are easily molded into lightweight articles of any shape or form. These materials are normally in liquid or slurry forms and can be simply cast into various shapes according to the molds used. Consequently, such resins may be used as decorative materials for various building surfaces.

There are, however, some limitations to the use of such materials in decorating building surfaces. The limitations include the strength, durability, size, shape, and thickness of the resins which cannot meet users' requirements. Specifically, the resin work pieces are produced as individual pieces and, when in actual use, a highly skilled artisan is required to arrange each resin piece into the desired pattern. This requires a lot of labor and time, which will result in high costs and long delivery lead times. In turn, this will be prohibitive in upgrading the use of such materials to an industrial scale.

Accordingly, the present specification relates to an improved process of using molded resin in a decorative surface covering. As used herein and in the appended claims, the term "decorative surface covering" will refer to any material that is designed to be applied to a surface, including, but not limited to, floors, walls, ceilings, columns, and other building features.

As disclosed herein, a fabric is used as a substrate on which quantities of a resin, in a moldable state, are applied. The resin is then molded into desired shapes and patterns, which also causes the molded resin elements to adhere to the underlying fabric. The fabric and molded resin elements can then be quickly and efficiently applied to any desired surface as a decorative surface covering. The molding and coloring of the resin elements can allow them to assume the appearance of any of the traditional surface coverings including tile, ceramics, mosaics, etc.

Consequently, the objective of the present specification is to solve the issues identified above that arise from using traditional decorative surface covering materials, particularly those that are produced as small individual pieces for decorating building walls and floors. To achieve this, the present specification discloses and describes fabric sheets with molded resin pieces disposed thereon and formed into a desired pattern, thus obviating the need for manual placement of individual tiles or the like. In some examples of the disclosed process, small pieces of resin are arranged on a net fabric into various patterns and then molded into a desired form. The resulting decorative surface covering and method can produce covering products for use on an industrial scale.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

With reference to FIG. 1, an illustrative process of producing a decorative surface covering including resin features on a fabric according to the present specification may include of the following steps. As will be appreciated by those skilled in the art, the steps of the illustrated example may be changed or reordered as best suits a particular application.

Referring to FIG. 1, the resin is prepared (step 101). For example, polyester resins are mixed with pigments and/or mineral powder, such as aluminum-based or calcium-based powder, to provide different color or color materials and/or textures as desired, i.e., clear materials, pearl materials, opaque materials, striped materials, cloudy materials, and then 0.5-3% of peroxide and 0.5%-3% of metal salts such as Cobalt are added in order to harden the resin. In this example, the mixture is then blended with a blender.

After preparing the resin, the resin is applied to an underlying fabric (step 102). In some examples, a net fabric is placed on a mold especially designed with the desired pattern for the decorative surface covering being fabricated. Then, the polyester resin mixture is poured onto the net fabric. The resin may entirely cover the fabric or may be applied only at selected locations on the fabric. A release film may be used to help remove the finished resin fabric from the mold. This film can be any type of material that will not adhere to the hardened resin and can withstand the molding temperature without melting or tearing. Mylar films although not limited to only this type of film have been tested effectively in this application.

Once the resin is applied to the fabric, the resin is molded (step 103). For example, a hydraulic press may apply pressure to the mold to shape the resin according to the mold. In using a hydraulic press in resin fabric molding, the pressure is controlled so that the mold is tightly closed and the temperature is controlled according to the thickness of the desired work piece in the range of 70-120 degrees Celsius. The retention time in the mold also depends on the thickness of the work piece. If the work piece has greater thickness, then larger retention time and lower temperatures are required so as to minimize cracking. It is important to keep the temperature uniform and constant across the surface of the fabric to prevent warping or inconsistencies in the finished resin fabric.

In some embodiments, the resin may then painted, colored, or otherwise finished to produce a desired appearance (step 104). The result is a decorative surface covering that can be either a continuous resin fabric or a fabric substrate covered by pieces of resin arranged in any desired pattern.

Figure 2:
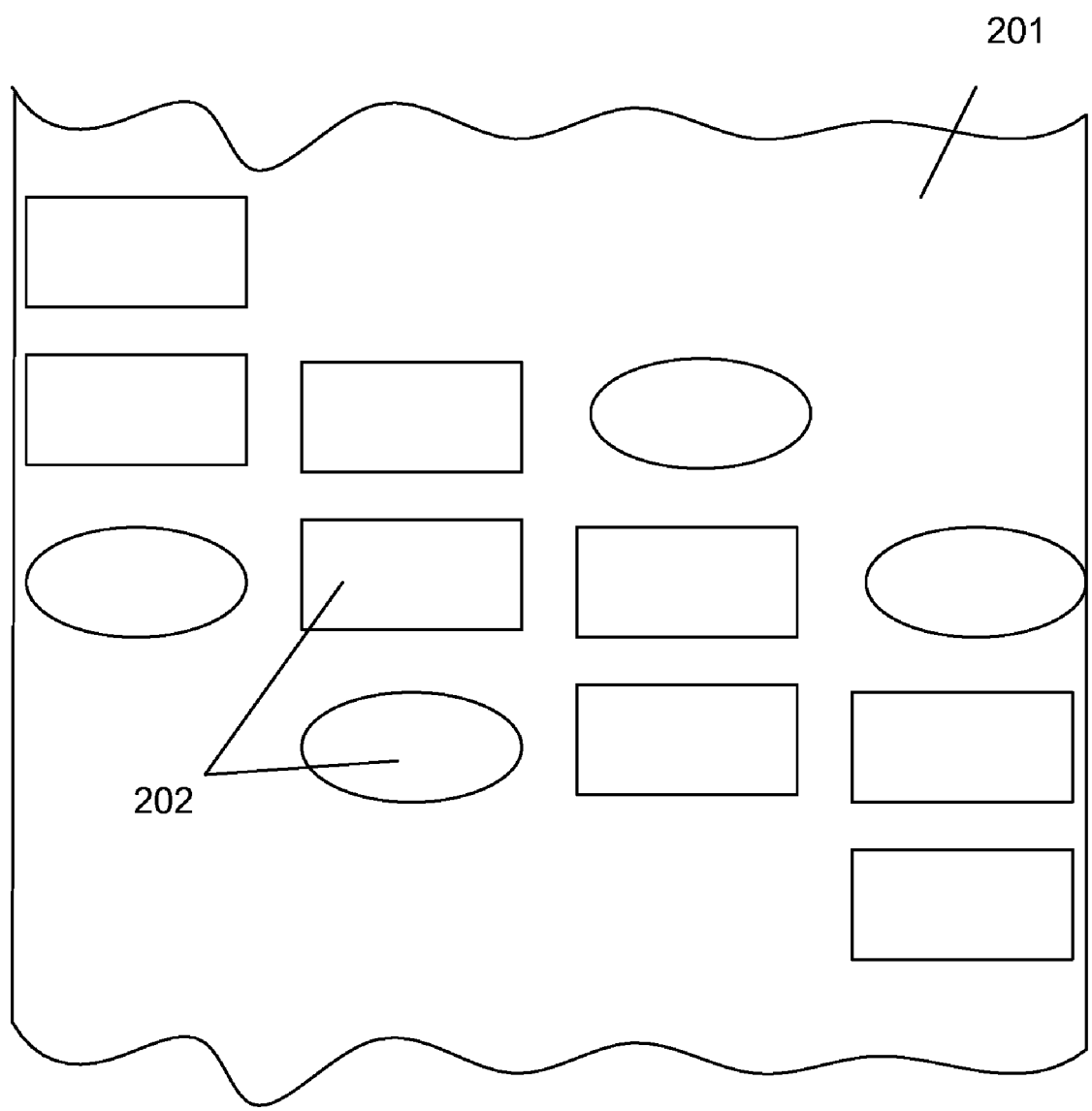
FIG. 2 shows an illustrative example of a decorative surface covering according to principles described herein.

A property of the net fabric described herein is that the fabric that can endure pressure and heat without tearing, specifically, the heat of molten resin and the heat and pressure of the molding process. The weave of the netting or fabric used will affect the flexibility of the resulting decorative surface covering. Tighter weaves will result in the resulting fabric being stiff and inflexible, while looser weaves will result in more flexible surface coverings. The weave of the netting is chosen based on the size of the resin pattern and the size of the resin pieces to be formed on the fabric sheets. Smaller resin pieces to be formed on the resin fabric require tighter weaves to ensure that enough of the fabric's fibers attach to the resin pieces that the resin elements remain firmly adhered to the underlying fabric FIG. 2 illustrated one possible example of a decorative surface covering according to the present specification. As shown in FIG. 2, the covering including an underlying fabric (201). On the fabric (201), a layer of resin (202) is formed and molded into any variety of decorative shapes. As indicated above, the resin layer (202) may be continuous over the fabric (201) or may be formed in islands on the fabric (201). In either case, the resin layer may have any profile, texture or feature with respect to the fabric (201) as provided by the molding process.

With the process of producing a decorative surface covering or continuous resin fabric according to the present specification, a large number of pieces of molded resin arranged into various patterns on the net fabric are produced at a single time. The different patterns depend on the forms of the mold, which can be well applied to different architecture, especially in decorating various building surfaces.

In addition, various patterns can be applied to the continuous resin fabric according to the present specification, such as ethnic designs, floral, dipping water, curvature, wavy, weave-like, roman, graphic, and other patterns as desired, but without the need for manpower in arranging tile or similar elements piece by piece. The resin features can be made into geometric shapes, i.e., rectangular, spherical, cyclical, cut, tapering, concave, etc. The color materials can be mixed into various colors, depending upon the color shades of the resin and the various types of surface covering desired, such as cloudy, clear, opaque, matte, pearly, stripes, etc.

In another application, the covering described herein made of a molded resin on an underlying fabric can be formed into garments, clothing, hats, handbags, and other ornaments as in fashion.

In still another application, the continuous resin fabric according to the present specification can be used for the fabrication of various jewelry accessories and a variety of products without limitation encompassing furniture such as tables, sideboards, beds, lamps, and chairs. This, in turn, creates additional products in the fashion field, and owing to the properties of the continuous resin fabric having light weight and having the resin pieces arranged on the net fabric, is easy for transportation and installation, and is durable.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A decorative surface covering comprising:
a fabric; and
a layer of molded resin disposed on said fabric,
said resin being molded into decorative features of said covering
wherein said layer of molded resin is disposed as discrete resin elements on a surface of said fabric.

2. The covering of claim 1, wherein said fabric is a net fabric.

3. The covering of claim 1, wherein said layer of molded resin is continuous over a surface of said fabric.

4. The covering of claim 1, wherein said discrete resin elements are arranged in a decorative pattern.

5. A method of forming a decorative surface covering, said method comprising molding resin disposed on a fabric to produce decorative features, said resin adhering to said fabric, wherein said molded resin is applied at discrete locations over a surface of said fabric.

6. The method of claim 5, wherein said fabric is a net fabric.

7. The method of claim 6, wherein a weave of said net fabric is selected based on a size of said decorative features of molded resin.

8. The method of claim 5, further comprising disposing said fabric in a mold and then applying said resin prior to molding said resin.

9. The method of claim 5, further comprising applying said resin in a continuous layer over a surface of said fabric.

10. The method of claim 5, wherein said discrete locations form a decorative pattern.

11. The method of claim 5, further comprising coloring said resin prior to molding.

12. The method of claim 5, further comprising molding said resin with a hydraulic press.

13. The covering of claim 1, wherein said surface covering further comprises a release film disposed on said layer of molded resin and fabric.

14. The covering of claim 1, wherein said fabric is heat resistant so as to avoid damage to said fabric when receiving said molten resin.

15. The covering of claim 1, wherein said resin contains pigments and mineral powder.

16. The covering of claim 1, wherein said covering is molded with a desired pattern.

17. The covering of claim 1, wherein the covering comprises a colored finish.

18. A decorative surface covering comprising:
a heat resistant fabric; and
a layer of resin disposed on said fabric;
wherein said resin adheres to said fabric;
wherein said resin is molded with a desired pattern; and
wherein said decorative surface covering further comprises a release film disposed on said resin.

19. The covering of claim 1, wherein peroxide is added to said molded resin.

* * * * *